Feb. 5, 1957 L. K. HEDDING ET AL 2,780,766
DRY CELL RECONDITIONING DEVICE
Filed June 30, 1954 2 Sheets-Sheet 1

INVENTORS
Linnie K. Hedding and
BY Regis H. Zetwo

W. L. Stout
THEIR ATTORNEY

Feb. 5, 1957  L. K. HEDDING ET AL  2,780,766
DRY CELL RECONDITIONING DEVICE
Filed June 30, 1954  2 Sheets-Sheet 2

INVENTORS
Linnie K. Hedding and
Regis H. Zetwo
BY
W. H. Stout
THEIR ATTORNEY

United States Patent Office 2,780,766
Patented Feb. 5, 1957

2,780,766

DRY CELL RECONDITIONING DEVICE

Linnie K. Hedding, Wilkinsburg, and Regis H. Zetwo, Swissvale, Pa., assignors to Westinghouse Air Brake Company, Wilmerding, Pa., a corporation of Pennsylvania Application June 30, 1954, Serial No. 440,494

6 Claims. (Cl. 320—4)

Our invention relates to apparatus for reconditioning dry cell batteries of the type used in connection with hearing aids, flashlights, and the like.

It is a well-known fact that dry cell batteries may be reconditioned by passing through each battery a current of a polarity opposite to the normal polarity of the battery. While dry cell batteries are not rechargeable in the same sense as storage batteries, reconditioning increases the useful service life of the dry cell battery many times. The reconditioning process amounts in part to depolarization of the battery, but tests indicate that other beneficial action takes place.

Dry cell batteries can be reconditioned repeatedly. The longest total service life is obtained when a battery is used for a short while without completely discharging the battery and then reconditioned and reused. For example, a person using hearing aid batteries during the daytime could recondition his batteries during his sleeping hours. This would result in many more days of service from his batteries than would be obtained if the batteries were used until seemingly exhausted before an attempt was made to recondition them.

In practicing our invention, we provide a container having one or more cavities in which dry cell batteries to be reconditioned may be placed. Within the container is a circuit means comprising a transformer and rectifiers for supplying the battery terminals with reconditioning current. Our invention further provides means for preventing the electrical contacts in the ends of the cavities from presenting an electrical shock hazard when the battery is not in the cavity.

It is therefore an object of our invention to provide a reconditioning apparatus from which there is little possibility of the user receiving an electrical shock.

It is further an object of our invention to provide a simple, safe, inexpensive and foolproof apparatus for reconditioning dry cell batteries.

Another object of our invention is to provide an apparatus having a means for indicating to the user that the reconditioner is operating.

Other objects of our invention and features of novelty will be apparent from the following description taken in connection with the accompanying drawings.

We shall now describe several forms of dry cell battery reconditioning devices embodying our invention, and shall then point out the novel features thereof in claims.

In the drawings.

Similar reference characters refer to similar parts in each of the several views.

Figure 1:
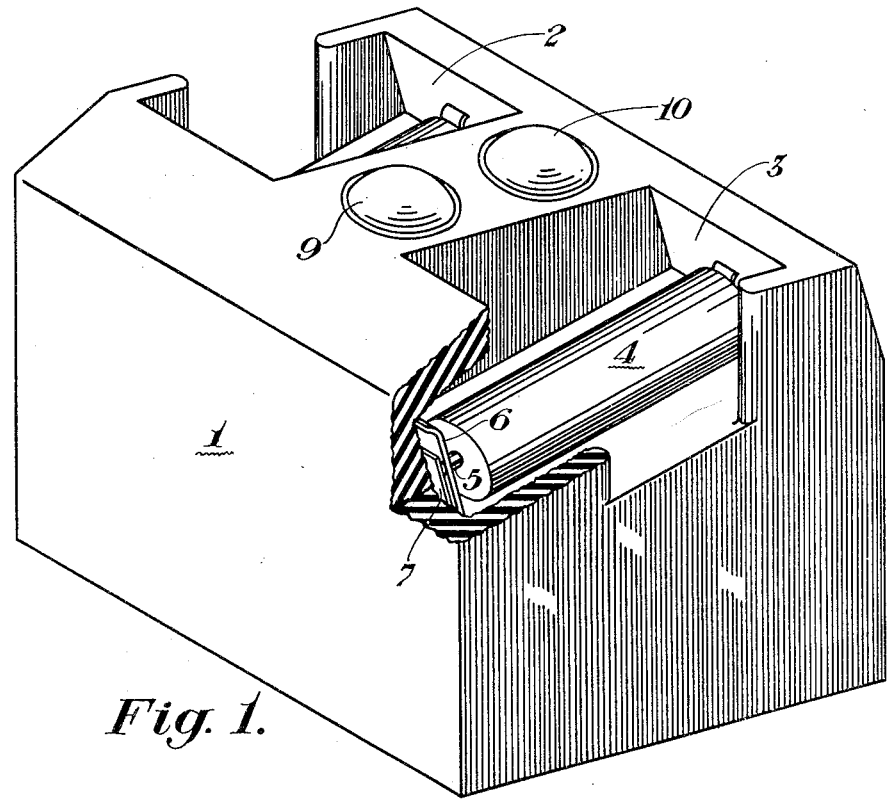
Fig. 1 is an isometric view showing one form of the battery reconditioning device embodying our invention, with a portion of the housing cut away to better illustrate the construction of the parts.
Figure 3:
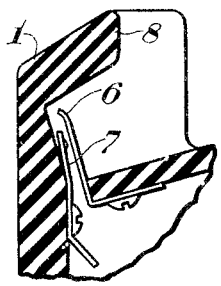
Fig. 3 is a detail sectional view showing one type of electrical contact which may be employed in our invention.
Figure 4:
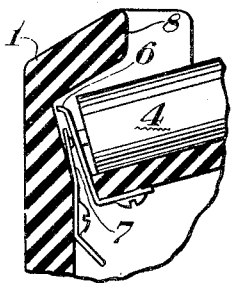
Fig. 4 is a view similar to Fig. 3 except that the battery is shown placed against the contact.

Referring to Fig. 1 of the drawing, there is shown a housing 1 having cavities 2 and 3 adapted to receive dry cell batteries to be reconditioned. As shown in Fig. 1, the battery 4 is placed in the cavity 3 with the terminal 5 of the battery touching contact 6 which in turn touches contact 7. Figs. 3 and 4 show the contacts in detail. Contact 7 is always energized by a source of battery reconditioning current. When the battery 4 is not in the cavity contact 6 does not touch contact 7 and therefore contact 6 is not energized with battery reconditioning current. Contact 6 further is used to shield contact 7 so that the user of the reconditioning device cannot place his finger against the energized contact 7. The overhanging portion or lip 8 on the housing at the top of the cavity 3 further prevents the user from touching contact 7. Contact 6 is made of spring material and is positioned so as to contact with a terminal of the battery. At the same time, proper placement of the battery in the cavity causes contact 6 to be pressed against contact 7.

The two cavities in the housing 1 are usually arranged to receive batteries of different voltages, such as an "A" battery and a "B" battery. For example, the cavity 2 might be arranged to receive the "A" battery while the cavity 3 receives the "B" battery.

Lamps 9 and 10 are means for providing a visual indication that the reconditioning device is functioning. In the place of the lamps a voltmeter (not shown) may be used. When a voltmeter is used for this purpose its reading may also provide an indication of the condition of the battery.

Figure 2:
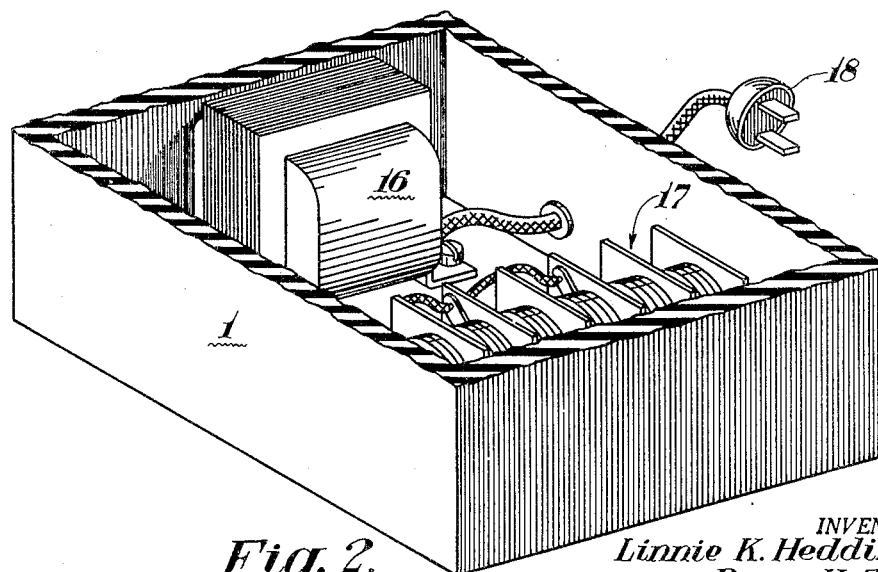
Fig. 2 is a view of the bottom portion of the housing showing a possible arrangement of the circuit components for producing a current suitable for reconditioning dry cell batteries.

Fig. 2 shows the bottom portion of the container 1 having placed therein a transformer 16 and a dry disk type of rectifier 17. The plug 18 may be inserted in a conventional wall type of an electrical outlet (not shown) supplied with suitable alternating current energy. Electrical circuits that may be used for producing dry cell battery reconditioning current will be described later. However, it should be pointed out that the bottom portion of the container houses the means for producing current suitable for reconditioning dry cell batteries.

Figure 5:
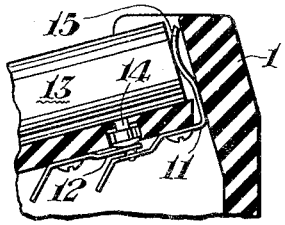
Fig. 5 is a view in side elevation showing still another type of electrical contact that may be embodied in our invention.

Fig. 5 shows another method for energizing a battery engaging contact member 11. By placing a battery 13 in a cavity, the contact member 11 is energized with a source of battery reconditioning current by the battery 13 pressing on an insulated actuating button 14 which causes the contact 12 to touch one end of the contact member 11. This completes the circuit for energizing contact member 11 with the reconditioning current. The other end of the contact 11 is so positioned that it presses against terminal 15 when the battery 13 is properly placed in the cavity and thereby energizes the battery 13 with reconditioning current.

Figure 6:
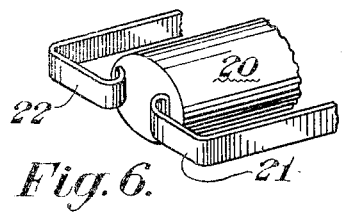
Fig. 6 is a perspective view of still another type of electrical contact that may be embodied in our invention.

Fig. 6 shows a means in which the placing of a battery 20 in the cavity causes a circuit to be completed between two adjacent contacts 21 and 22 due to both contacts touching the same battery terminal. In this arrangement, if a lamp is placed in series with the contact 22 (see Fig. 8) and a source of power is applied across the contacts 21, 22 and the lamp, the battery in completing the circuit between the contacts 21 and 22, will cause the series lamp to be lit. This would indicate that the battery is firmly within the reconditioning clips or contacts of the particular cavity.

Figure 7:
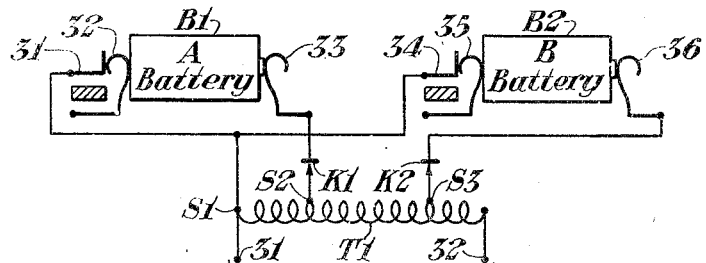
Figs. 7 and 8 show circuit diagrams for supplying battery reconditioning current to batteries in accordance with our invention.

Referring to Fig. 7, there is shown a diagram partly schematic and partly pictorial of apparatus and connections thereto for producing current suitable for reconditioning dry cell batteries. In this circuit an auto-transformer T1 is supplied with suitable alternating current from a source (not shown) connected to terminals 31 and 32. Suitable voltages are obtained from the secondary terminals of the transformer and utilized in producing the reconditioning current. The reconditioning current for battery B1 flows over a path that may be traced from transformer secondary terminal S1 through contact 31, contact 32, battery B1, contact 33, and rectifier K1 to transformer secondary terminal S2. The reconditioning current for battery B2 flows over a path that may be traced from transformer secondary terminal S1 through contact 34, contact 35, battery B2, contact 36, and rectifier K2 to transformer secondary terminal S3. Rectifiers K1 and K2 may be any type of rectifier that will permit adequate current to flow through the circuit. However, the dry disk type of rectifier is particularly well suited for this application. It will be seen that with the apparatus connected in this manner, the batteries B1 and B2 will be supplied with half-wave rectified energy which is suitable for reconditioning dry cell batteries.

Figure 8:
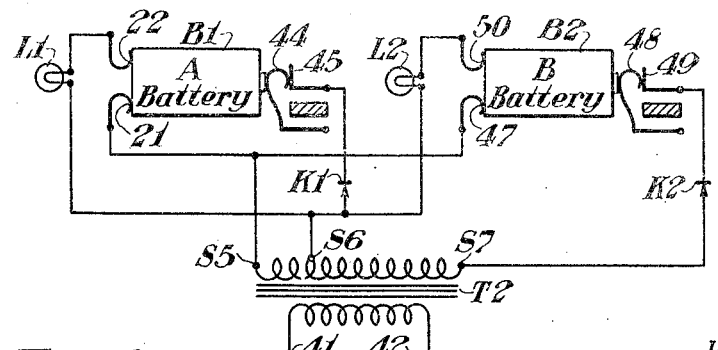

Referring to Fig. 8, there is shown a diagram partly schematic and partly pictorial of another form of apparatus and connections thereto for producing current suitable for reconditioning dry cell batteries. This diagram is similar to Fig. 7 except that an isolating transformer T2 replaces the auto-transformer T1, and circuits are shown for energizing lamps L1 and L2. The primary of transformer T2 is supplied with suitable alternating current from a source (not shown) connected to the terminals 41 and 42. Suitable voltages are obtained from the secondary terminals of the transformer and utilized in producing the reconditioning current. The reconditioning current for the battery B1 flows over a path that may be traced from transformer secondary terminal S5, through contact 21, battery B1, contact 44, contact 45, and rectifier K1, to transformer secondary terminal S6. It can also be seen that one terminal of battery B1 completes a circuit (here-in-after traced) between contacts 21 and 22 to thereby cause lamp L1 to be energized through the terminal 22 if the battery is properly in place. The circuit for energizing lamp L1 may be traced from the transformer secondary terminal S5, contact 21, the end of battery B1, contact 22 and lamp L1 to terminal S6. The reconditioning current for battery B2 flows over a path that may be traced from transformer secondary terminal S5, through contact 47, battery B2, contact 48, contact 49 and rectifier K2 to transformer secondary terminal S7. It can also be seen that one terminal of battery B2 completes the circuit between contacts 47 and 50 thereby causing lamp L2 to be energized when the battery is properly in place. The circuit for energizing lamp L2 may be traced from the transformer secondary terminal S5 through contact 47, battery B2, to contact 50, through lamp L2, to terminal S6 of the transformer.

It is to be particularly noted that a user of our battery reconditioner is protected against shock hazards by two important features. The first feature is the overhanging lip 8 which ordinarily prevents accidental contact of the user with the contacts located thereunder. The second feature is the circuit make-and-break controller that energizes the battery engaging contacts of the reconditioner only when a battery is properly placed within the reconditioner cavity.

It is obvious, therefore, that the user of our reconditioner avoids possible shock hazards that might prove dangerous.

Although we have herein shown and described only a few forms of dry cell battery reconditioning devices embodying our invention, it is to be understood that various changes and modifications may be made within the scope of the appended claims without departing from the spirit and scope of our invention.

Having thus described our invention, what we claim is:

1. A dry cell battery reconditioning device comprising a housing which houses a means for producing current suitable for reconditioning dry cell batteries, said housing being provided with a plurality of cavities each arranged to accommodate a dry cell battery to be reconditioned, each of said cavities having electrical contacts mounted therein which are arranged to make contact with the terminals of a dry cell battery inserted into each cavity and at least one of said contacts in each of said cavities being arranged to be energized with said current only when a battery is placed in said cavity.

2. A dry cell battery reconditioning device comprising a housing which houses a means of producing current suitable for reconditioning dry cell batteries, said housing being provided with cavities that are adapted to accommodate dry cell batteries to be reconditioned, said cavities having electrical contacts mounted therein which are arranged to make contact with the terminals of batteries placed within said cavities, and at least one of said contacts within each cavity being energized with said current only when a battery is placed in said each cavity, said container having a visible indicating device for each cavity operable by a suitable current upon insertion of a battery.

3. A dry cell battery reconditioning device comprising a housing for housing a means for producing current suitable for reconditioning dry cell batteries, said housing being provided with one or more cavities that are arranged to accommodate dry cell batteries to be reconditioned, said cavities each having electrical contacts mounted therein which are arranged to make contacts with the terminal of an inserted battery, one of said inserted battery terminals touching both of two adjacent electrical contacts thereby completing an electrical circuit between the two adjacent electrical contacts, and a lamp connected in said electrical circuit such that the lamp will be energized when the electrical circuit is completed.

4. A dry cell battery reconditioning device comprising a housing which houses a means for producing current suitable for reconditioning dry cell batteries, said housing being provided with cavities that are arranged to accommodate a dry cell battery to be reconditioned, said cavities each having electrical contacts mounted therein which are arranged to make contacts with the terminals of an inserted battery, each of said cavities having an electrical contactor whose contacts are closed by means of a battery being in its proper position in said each of said cavities, said electrical contactor contacts when closed completing an electrical circuit for applying said reconditioning current to said inserted battery.

5. A dry cell battery reconditioning device comprising a housing which houses a means for producing current suitable for reconditioning dry cell batteries, said housing being provided with cavities which are arranged to accommodate dry cell batteries to be reconditioned, said cavities each having electrical contacts mounted therein which are arranged to make contacts with the terminals of an inserted battery, each of said cavities having an electrical contactor whose contacts are closed by means of a battery being in the proper position in each of said cavities, said electrical contactor contacts in each cavity when closed completing an electrical circuit for applying said reconditioning current to each battery inserted into each cavity, said electrical circuit comprising an auto-transformer having secondary taps connected through rectifiers to said contacts in said cavities.

6. A dry cell battery reconditioning device comprising a housing which houses a means for producing current suitable for reconditioning dry cell batteries, said housing being provided with cavities which are arranged to accommodate a dry cell battery to be reconditioned, said cavities each having electrical contacts mounted therein which are arranged to make contact with the terminals of an inserted battery, each of said cavities having an electrical contactor whose contacts are closed by means of a battery being in its proper position in each of said cavities, said contactor contacts when closed completing an electrical circuit for applying said reconditioning current to each of said batteries, said electrical contactor for each cavity comprising two housing secured normally opened spring contacts, said spring contacts being provided with an actuator extending into said housing cavity such that insertion of a battery into said cavity depresses said actuator causing a closing of said contacts.

References Cited in the file of this patent
UNITED STATES PATENTS

| | | |
|---|---|---|
| 2,036,547 | Siemon | Apr. 7, 1936 |
| 2,369,033 | Eubank | Feb. 6, 1945 |
| 2,410,527 | Shinske | Nov. 5, 1946 |